United States Patent [19]

Johnson, Jr.

[11] 4,067,184
[45] Jan. 10, 1978

[54] NOISE REDUCING SPINDLE WASHERS

[75] Inventor: Joseph John Johnson, Jr., Powder Springs, Ga.

[73] Assignee: Coats & Clark, Inc., Stamford, Conn.

[21] Appl. No.: 731,758

[22] Filed: Oct. 12, 1976

[51] Int. Cl.² ............................................. D01H 7/08
[52] U.S. Cl. ..................................... 57/135; 85/50 R; 181/207; 248/358 R
[58] Field of Search ................................ 57/134–135; 85/50 R, 1 JP; 248/54 R, 56, 358 R; 403/220; 181/33 A

[56] References Cited

U.S. PATENT DOCUMENTS

| 1,775,517 | 9/1930 | Flinterman | 248/358 R X |
| 2,304,370 | 12/1942 | Neal | 57/135 X |
| 2,650,465 | 9/1953 | Westall | 57/135 |
| 3,257,969 | 6/1966 | Thomas | 248/358 R X |
| 3,493,221 | 2/1970 | Mogdzanowski | 248/358 X |
| 3,779,585 | 12/1973 | Handzlik | 248/56 X |
| 3,929,729 | 12/1975 | Chung | 248/358 R X |

Primary Examiner—Richard C. Queisser
Assistant Examiner—Charles Gorenstein
Attorney, Agent, or Firm—Burgess, Ryan and Wayne

[57] ABSTRACT

A noise reducing washer for the spindle of a textile machine has a pair of outer hard resilient washers, for example, of nylon, and a soft washer, for example of rubber, sandwiched therebetween. The composite washers are adapted to be fit on the spindles above and below the machine frame.

4 Claims, 7 Drawing Figures

NOISE REDUCING SPINDLE WASHERS

BACKGROUND OF THE INVENTION

This invention relates to noise reduction devices for textile machinery, and is particularly directed to the reduction of noise which results from the mounting of spindles on the frames of textile machinery.

In the past, the spindles on spinning frames and twisters were attached to the spindle base rails by extending the base of the spindle through a hole in the spindle base rail of the textile machine. The spindle has a sufficiently large diameter that a shoulder thereon engages the top of the base rail. The lower extension of the spindle is threaded, so that a nut may be tightened over the threaded portion of the spindle base and against the underside of the base rail. Under normal conditions, there is consequently metal to metal contact, when the spindles are mounted in this manner, so that a resonating effect is produced, and any noise created by the rotating spindle is amplified.

The noise produced by a single rotating spindle is of course not very great, but in a processing room, for example, for the production of thread or yarn, there may be many hundreds or thousands of such rotating spindles. As a consequence, the noise produced by the spindles may be very great.

For example, spindles mounted in the above manner may result in noise levels in a room exceeding 90 db.

There are of course many well known noise reducing techniques, and modern textile equipment may readily be designed to take advantage of such techniques, to reduce the room noise levels to a tolerable value. The useful life of textile machinery, such as thread and yarn spinning frames and the like, is quite long, however, so that full replacement of the equipment is neither economically justified nor warranted.

There have been recent interests in the reduction of noise level in factories, from the standpoint of safety and health, and standards have been established with respect to the length of time that a worker may be present in a room at given noise levels. The noise level in the rooms of a textile mill has been adequately high in the past, that workers were not permitted to spend full working days in the rooms, without ear muffs or the like. This is of course undesirable from a standpoint of operating and maintaining the equipment, since, particularly, with the less modern equipment, manual operations such as doffing and donning may be required. The solution of requiring the workers to wear ear muffs has not been found to be satisfactory or accepted by the workers.

The present invention is therefore directed to the provision of noise reduction means, for reducing the above described spindle noise in textile machines. While the invention is particularly directed to the provision of noise reducing means that may readily and economically be employed on existing textile machines, it will of course be apparent that the invention contemplates the extension of the same concept to new equipment, if desired.

Briefly stated, in accordance with the invention, a pair of washers are provided for each spindle of the textile machines. The washers are placed to engage opposite sides of the machine frame surrounding the spindle hole, so that the spindle and nut assembly clamp the washers therebetween, substantially isolating the spindles from the machine frame, for the transmission of noise and resonating effects.

Specifically, noise reducing washers which have been found to be particularly satisfactory for the above purpose, are comprised of a pair of hard plastic washers, for example, of nylon, between which a soft elastic washer, for example of rubber, is sandwiched. The rubber washer has a plurality of holes extending axially therethrough at a common radius, and each of the outer nylon washers has alternating projections and holes at the same radius. The noise reducing washer is assembled so that the projections of one outer washer are aligned with the holes of the other outer washer, and extend into the corresponding holes of the intermediate rubber washer.

BRIEF FIGURE DESCRIPTION

In order that the invention will be more clearly understood, it will now be disclosed in greater detail, with reference to the accompanying drawings, wherein.

DETAILED DESCRIPTION OF THE INVENTION

Figure 1:
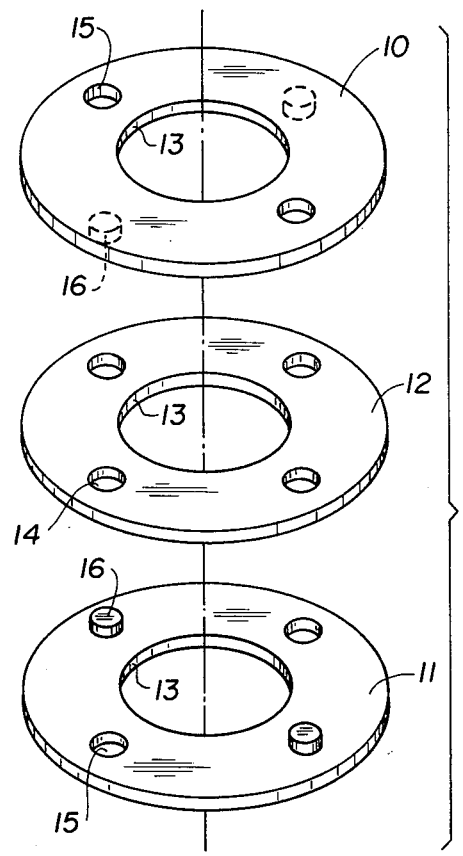
FIG. 1 is an exploded view of a noise reducing washer in accordance with the invention.

Referring now to the drawings, and more in particular to FIG. 1, a noise reducing washer in accordance with the invention is comprised of a pair of coaxial outer washers 10 and 11, with an intermediate washer 12 coaxial with and sandwiched between the outer washers 10 and 11. The central holes 13 of the three washers have substantially equal diameters, the diameter being slightly greater than the diameter of a spindle over which the washers are to be mounted.

Figure 5:
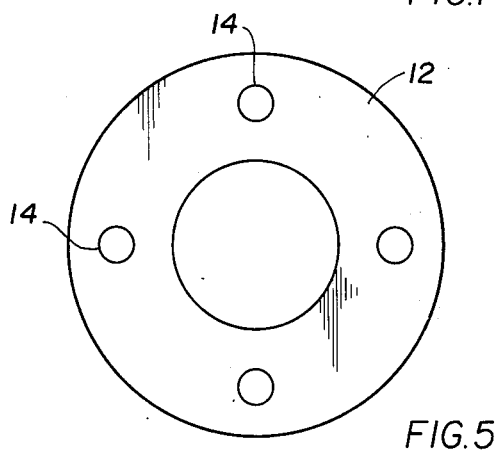
FIG. 5 is a plan view of the intermediate washer on the noise insulating washer of FIG. 1.
Figure 6:
FIG. 6 is a side view of the washer of FIG. 5.

As more clearly seen in FIGS. 5 and 6, the intermediate washer 12 is provided with a plurality of axially extending holes, i.e., an even number of holes 14, equally spaced at a common radius. The washer 12 is preferably of a soft resilient material, such as rubber, neoprene or the like.

Figure 2:
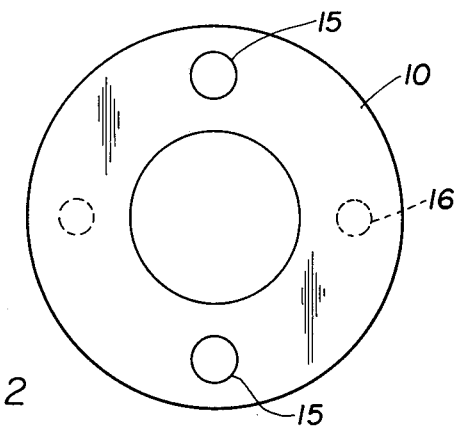
FIG. 2 is a plan view of one side of an outer elemental washer of the noise reducing washer of FIG. 1; p
Figure 3:
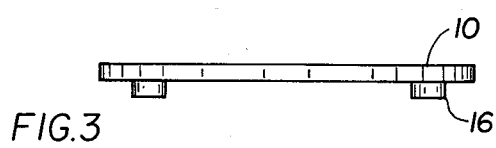
FIG. 3 is a side view of the washer of FIG. 2.
Figure 4:
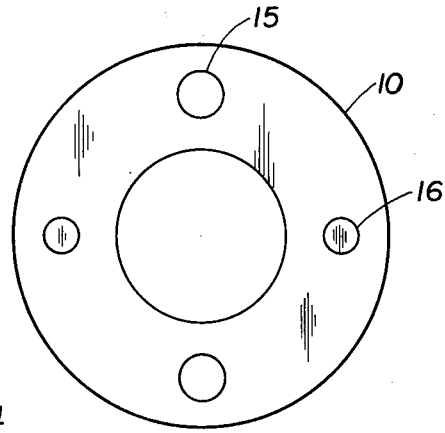
FIG. 4 is a plan view of the other side of the washer of FIG. 2.

As more clearly seen in FIGS. 2–4, the outer washers, such as the washer 10, is provided with alternating holes 15 and projections 16 at the same radius and of the same total number as the holes 14 of the intermediate washer 12. The holes 15 and projections 16 may thereby be aligned with respective holes 14 of the intermediate washer. As illustrated in the drawings, the projections 16 preferably have circular cross sections.

Referring again to FIG. 1, the noise reduction washer in accordance with the invention is assembled with the projections 16 on each outer washer being aligned with a corresponding hole 14 of the intermediate washer, and a corresponding hole 15 of the other outer washer. The projections 16 have a length to extend substantially through the corresponding holes 14 of the intermediate washer, in the unloaded state of the noise reduction washer, whereby, in the loaded state, the intermediate washer 12 is compressed, so that the projections 16 extend slightly or fully into the holes 15 of the other outer washer aligned therewith. In addition, due to the compression of the noise reduction washer in accordance with the invention, in a loaded condition, the intermediate washer is forced to extend radially inwardly, i.e., to bulge inwardly, to contact the spindle. This contact aids in the centering of the noise reduction washer on the spindle.

The outer washers 10, 11 are preferably of a "hard" plastic material, such as nylon or the like. Thus, in the present specification it will be understood that a "hard" plastic material is a plastic material which is not substantially deformed by the mounting of a noise reduction washer on a spindle, while a "soft" material, as employed for the intermediate washer, is a material which is substantially resiliently deformed by the mounting forces employed to mount the noise reduction washer on a spindle.

Figure 7:
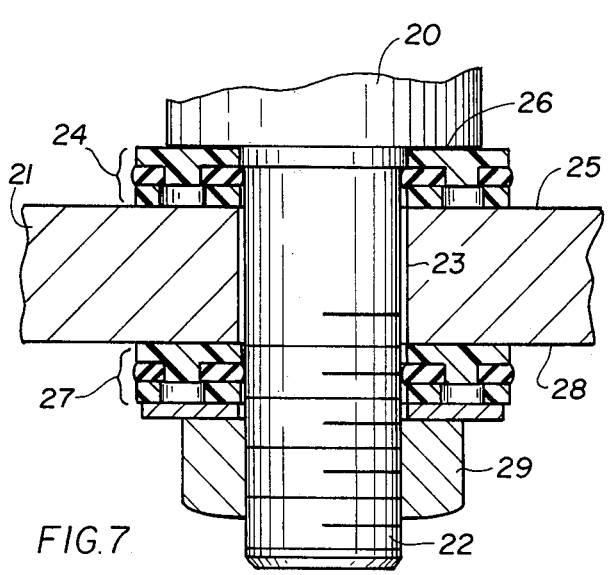
FIG. 7 is a partially cross sectional view, illustrating a pair of noise reducing washers in accordance with the invention mounted on the spindle of a textile machine.

Referring now to FIG. 7, therein is illustrated a spindle 20 mounted on the spindle base rail 21 of a spinning frame, employing the washers of the present invention. The spindle 20 has a threaded base 22 extending through a hole 23 in the rail 21, and one of the composite noise reduction washers 24 is mounted on one side 25 of the rails 21 surrounding the hole 23, so that the shoulder 26 of the spindle engages the washer 24. Another noise reduction washer 27 of the type illustrated in FIG. 1 is inserted between the other side 28 of the spinning base rail 21 and the nut 29 on the spindle. The nut 29 is tightened adequately to firmly hold the spindle in position. When the noise reduction washers are thus loaded, it is apparent that the projections of the outer washers therein may extend into the corresponding holes of the other outer washers therein.

The noise reduction washers in accordance with the invention require only a simple modification of the existing equipment, since it is merely necessary to remove the nut and spindle from the rail, and assemble a noise reduction washer on each side of the rail prior to reassembly. The noise reduction washers in accordance with the invention may be economically and easily produced. In practice, for example, it has been found that the use of the washers results in an overall reduction of noise level of about 4 db., considering of course that there was no overriding noise from other portions of the machinery. Such a reduction in noise level has been found to be adequate, in some cases, to enable an operator to work full time in a room incorporating the noise reduction washers of the invention on the spindles, whereas, previously, the employe could only be present in the room for a portion of a working day, in accordance with present government regulations. The invention therefore results in more economical manufacture of thread, yarn and other textile products, while improving the working conditions for personnel.

While the invention has been disclosed and described with reference to a single embodiment thereof, it will be apparent that various modifications may be made therein, and it is therefore intended in the following claims to cover each such variation and modification as falls within the true spirit and scope of the invention.

What is claimed is:

1. A noise suppression washer for the spindles of textile machinery, comprising a composite washer formed of first and second coaxial outer washers having aligned central spindle-receiving holes, and a coaxial intermediate washer sandwiched therebetween and having a central spindle-receiving hole aligned with said first-mentioned holes, said outer washers being of a hard plastic material, said intermediate washer being of a resilient material and having an even number of holes extending axially therethrough at a given radius, each of said outer washers having alternating holes and projections aligned with the holes of said intermediate washer, whereby the holes of one outer washer are aligned with the projections of the other outer washer, and the projections of each of said outer washers extend substantially through said intermediate washer in the unloaded state of said noise suppression washer, the portion of said intermediate washer adjacent the spindle-receiving hole therein being deformable in the loaded state of said noise suppression washer to flow radially inward into said spindle-receiving hole to contact a corresponding one of said spindles.

2. The noise suppression washer of claim 1, wherein said intermediate washer has four of said holes extending axially therethrough at said given radius, and each of said outer washers has two holes and two projections therein at said given radius.

3. Noise suppression means for a spindle of a textile machine, wherein the spindle is adapted to extend through a hole in a machine frame and has a shoulder adapted to engage a frame on one side of the hole, and a nut threaded through the spindle is adapted to engage the frame on the other side of the hole, said noise suppression means comprising a pair of noise suppression washers, said washers engaging said frame at opposite ends of said hole, whereby said spindle extends through the holes in said washers, with the shoulder of said spindle engaging one washer and the nut threaded on said spindle engaging the other washer, each of said noise suppression washers comprising a pair of coaxial nylon washers separated by a rubber washer that is more resilient than said nylon washers, said rubber washer having an even number of a plurality of holes extending therethrough at a common radius, said nylon washers having alternating projections and holes at said common radius, with the projections of each nylon washer being aligned with the holes of the other nylon washer and extending through a corresponding hole of said rubber washer.

4. The noise suppression means of claim 3, wherein said projections of said nylon washers have circular cross sections.

* * * * *

UNITED STATES PATENT OFFICE
CERTIFICATE OF CORRECTION

Patent No. 4,067,184          Dated January 10, 1978

Inventor(s)   Joseph John Johnson, Jr.

It is certified that error appears in the above-identified patent and that said Letters Patent are hereby corrected as shown below:

Column 2, line 24:   Delete "p".

lines 24-25:   "FIG. 3 is a side view of the washer of FIG. 2;" should be set off as a separate paragraph.

Signed and Sealed this

Thirteenth Day of June 1978

[SEAL]

Attest:

RUTH C. MASON  
Attesting Officer

DONALD W. BANNER  
Commissioner of Patents and Trademarks